(12) United States Patent
Donald et al.

(10) Patent No.: US 8,066,063 B2
(45) Date of Patent: Nov. 29, 2011

(54) CAPILLARY INJECTOR

(75) Inventors: Ian Donald, Aberdeenshire (GB); John Reid, Invergowrie (GB); Manish Vyas, Houston, TX (US)

(73) Assignee: Cameron International Corporation, Houston, TX (US)

( * ) Notice: Subject to any disclaimer, the term of this patent is extended or adjusted under 35 U.S.C. 154(b) by 29 days.

(21) Appl. No.: 12/441,119

(22) PCT Filed: Sep. 13, 2007

(86) PCT No.: PCT/US2007/078436
§ 371 (c)(1),
(2), (4) Date: Mar. 12, 2009

(87) PCT Pub. No.: WO2008/034024
PCT Pub. Date: Mar. 20, 2008

(65) Prior Publication Data
US 2009/0266542 A1  Oct. 29, 2009

(30) Foreign Application Priority Data

Sep. 13, 2006 (GB) ................................. 0618001.2

(51) Int. Cl.
*E21B 19/08* (2006.01)
(52) U.S. Cl. ...................... 166/88.4; 166/368; 166/95.1
(58) Field of Classification Search ................. 166/90.1, 166/279, 305.1
See application file for complete search history.

(56) References Cited

U.S. PATENT DOCUMENTS

| | | | |
|---|---|---|---|
| 1,758,376 A | 5/1930 | Sawyer | |
| 1,944,573 A | 1/1934 | Williams et al. | |
| 1,944,840 A | 1/1934 | Humason | |
| 1,994,840 A | 3/1935 | Thoen | |
| 2,132,199 A | 10/1938 | Yancey | |
| 2,233,077 A | 2/1941 | Gillespie et al. | |
| 2,276,883 A | 3/1942 | Schon et al. | |
| 2,412,765 A | 12/1946 | Buddrus et al. | |
| 2,790,500 A | 4/1957 | Jones | |
| 2,893,435 A | 7/1959 | Eichenberg | |
| 2,962,356 A * | 11/1960 | Johns ........................... | 423/269 |
| 3,101,118 A | 8/1963 | Culver et al. | |
| 3,163,224 A | 12/1964 | Haeber et al. | |
| 3,358,753 A | 12/1967 | Haeber | |
| 3,378,066 A | 4/1968 | Otteman et al. | |
| 3,593,808 A | 7/1971 | Nelson | |

(Continued)

FOREIGN PATENT DOCUMENTS
AU           498216           4/1999
(Continued)

OTHER PUBLICATIONS

U.S. Appl. No. 60/513,294, filed Oct. 22, 2003 (15 p.).
(Continued)

*Primary Examiner* — Daniel P Stephenson
*Assistant Examiner* — Blake Michener
(74) *Attorney, Agent, or Firm* — Conley Rose, P.C.

(57) ABSTRACT

A mineral extraction system includes a branch having a branch passage, a diverter coupled to the branch passage, and a capillary injection conduit disposed inside to the branch passage. A method of injecting chemicals includes injecting a chemical into a capillary injection conduit disposed internal to a production passage, wherein the chemical injection capillary conduit comprises an inlet and an outlet configured to terminate proximate a well formation.

11 Claims, 5 Drawing Sheets

U.S. PATENT DOCUMENTS

| | | | |
|---|---|---|---|
| 3,603,409 A | 9/1971 | Watkins | |
| 3,608,631 A | 9/1971 | Sizer et al. | |
| 3,688,840 A | 9/1972 | Curington et al. | |
| 3,705,626 A | 12/1972 | Glenn, Jr. et al. | |
| 3,710,859 A | 1/1973 | Hanes et al. | |
| 3,820,558 A | 6/1974 | Mueller | |
| 3,834,460 A | 9/1974 | Brun et al. | |
| 3,953,982 A | 5/1976 | Pennock | |
| 3,957,079 A | 5/1976 | Whiteman | |
| 4,042,033 A * | 8/1977 | Holland et al. | 166/310 |
| 4,046,191 A | 9/1977 | Neath | |
| 4,046,192 A | 9/1977 | Darnborough et al. | |
| 4,099,583 A | 7/1978 | Maus | |
| 4,210,208 A | 7/1980 | Shanks | |
| 4,223,728 A | 9/1980 | Pegg | |
| 4,260,022 A | 4/1981 | Van Bilderbeek | |
| 4,274,664 A | 6/1981 | Thominet | |
| 4,291,772 A | 9/1981 | Beynet | |
| 4,294,471 A | 10/1981 | Van Bilderbeek | |
| 4,347,899 A * | 9/1982 | Weeter | 166/310 |
| 4,401,164 A | 8/1983 | Baugh | |
| 4,403,658 A | 9/1983 | Watkins | |
| 4,405,016 A | 9/1983 | Best | |
| 4,457,489 A | 7/1984 | Gilmore | |
| 4,478,287 A | 10/1984 | Hynes et al. | |
| 4,502,534 A | 3/1985 | Roche et al. | |
| 4,503,878 A | 3/1985 | Taylor | |
| 4,509,599 A | 4/1985 | Chenoweth et al. | |
| 4,589,493 A | 5/1986 | Kelly et al. | |
| 4,607,701 A | 8/1986 | Gundersen | |
| 4,626,135 A | 12/1986 | Roche | |
| 4,629,003 A | 12/1986 | Baugh | |
| 4,630,681 A | 12/1986 | Iwamoto | |
| 4,646,844 A | 3/1987 | Roche et al. | |
| 4,695,190 A | 9/1987 | Best et al. | |
| 4,702,320 A | 10/1987 | Gano et al. | |
| 4,721,163 A | 1/1988 | Davis | |
| 4,756,368 A | 7/1988 | Ikuta et al. | |
| 4,813,495 A | 3/1989 | Leach | |
| 4,820,083 A | 4/1989 | Hall | |
| 4,830,111 A | 5/1989 | Jenkins et al. | |
| 4,832,124 A | 5/1989 | Rayson | |
| 4,848,471 A | 7/1989 | Bencze et al. | |
| 4,848,473 A | 7/1989 | Lochte | |
| 4,848,475 A | 7/1989 | Dean et al. | |
| 4,874,008 A | 10/1989 | Lawson | |
| 4,896,725 A | 1/1990 | Parker et al. | |
| 4,899,822 A | 2/1990 | Daeschler et al. | |
| 4,911,240 A | 3/1990 | Haney et al. | |
| 4,919,207 A | 4/1990 | Ikuta et al. | |
| 4,926,898 A | 5/1990 | Sampey | |
| 4,972,904 A * | 11/1990 | Godare | 166/90.1 |
| 5,010,956 A | 4/1991 | Bednar | |
| 5,025,865 A | 6/1991 | Caldwell et al. | |
| 5,044,672 A | 9/1991 | Skeels et al. | |
| 5,069,286 A | 12/1991 | Roensch et al. | |
| 5,074,519 A | 12/1991 | Pettus | |
| 5,085,277 A | 2/1992 | Hopper | |
| 5,143,158 A | 9/1992 | Watkins et al. | |
| 5,201,491 A | 4/1993 | Domangue | |
| 5,213,162 A | 5/1993 | Iato | |
| 5,248,166 A | 9/1993 | Wilkins | |
| 5,255,745 A | 10/1993 | Czyrek | |
| 5,280,766 A | 1/1994 | Mohn | |
| 5,295,534 A | 3/1994 | Porter | |
| 5,299,641 A | 4/1994 | Paulo et al. | |
| 5,456,313 A | 10/1995 | Hopper et al. | |
| 5,462,361 A | 10/1995 | Sato et al. | |
| 5,535,826 A | 7/1996 | Brown et al. | |
| 5,544,707 A | 8/1996 | Hopper et al. | |
| 5,678,460 A | 10/1997 | Walkowc | |
| 5,719,481 A | 2/1998 | Mo | |
| 5,730,551 A | 3/1998 | Skeels et al. | |
| 5,807,027 A | 9/1998 | Oestergaard et al. | |
| 5,868,204 A | 2/1999 | Pritchett et al. | |
| 5,927,405 A * | 7/1999 | Monjure et al. | 166/384 |
| 5,944,152 A | 8/1999 | Lindsay et al. | |
| 5,971,077 A | 10/1999 | Lilley | |
| 5,992,527 A | 11/1999 | Garnham et al. | |
| 6,039,119 A | 3/2000 | Hopper et al. | |
| 6,050,339 A | 4/2000 | Milberger | |
| 6,053,252 A | 4/2000 | Edwards | |
| 6,076,605 A | 6/2000 | Lilley et al. | |
| 6,098,715 A | 8/2000 | Seixas et al. | |
| 6,109,352 A | 8/2000 | Edwards et al. | |
| 6,116,784 A | 9/2000 | Brotz | |
| 6,123,312 A | 9/2000 | Dai | |
| 6,138,774 A | 10/2000 | Bourgoyne, Jr. et al. | |
| 6,145,596 A | 11/2000 | Dallas | |
| 6,182,761 B1 | 2/2001 | Bednar | |
| 6,186,239 B1 * | 2/2001 | Monjure et al. | 166/384 |
| 6,227,300 B1 | 5/2001 | Cunningham et al. | |
| 6,289,992 B1 * | 9/2001 | Monjure et al. | 166/384 |
| 6,296,453 B1 | 10/2001 | Laymen | |
| 6,321,843 B2 | 11/2001 | Baker | |
| 6,352,114 B1 | 3/2002 | Toalson et al. | |
| 6,388,577 B1 | 5/2002 | Carstensen | |
| 6,457,529 B2 | 10/2002 | Calder et al. | |
| 6,457,530 B1 | 10/2002 | Lam et al. | |
| 6,457,540 B2 | 10/2002 | Gardes | |
| 6,460,621 B2 | 10/2002 | Felton et al. | |
| 6,481,504 B1 | 11/2002 | Gatherar | |
| 6,484,807 B2 | 11/2002 | Allen | |
| 6,494,267 B2 | 12/2002 | Allen | |
| 6,497,286 B1 | 12/2002 | Hopper | |
| 6,557,629 B2 | 5/2003 | Wong et al. | |
| 6,612,368 B2 | 9/2003 | Kent et al. | |
| 6,637,514 B1 | 10/2003 | Donald et al. | |
| 6,651,745 B1 | 11/2003 | Lush et al. | |
| 6,755,254 B2 | 6/2004 | DeBerry | |
| 6,760,275 B2 | 7/2004 | Carstensen | |
| 6,805,200 B2 | 10/2004 | DeBerry | |
| 6,823,941 B2 | 11/2004 | Donald | |
| 6,840,323 B2 | 1/2005 | Fenton et al. | |
| 6,966,383 B2 | 11/2005 | Milberger et al. | |
| 7,040,408 B2 | 5/2006 | Sundararajan et al. | |
| 7,069,995 B2 * | 7/2006 | Chan et al. | 166/312 |
| 7,111,687 B2 | 9/2006 | Donald et al. | |
| 7,201,229 B2 | 4/2007 | White et al. | |
| 7,210,530 B2 | 5/2007 | Lush et al | |
| 7,270,185 B2 | 9/2007 | Fontana et al. | |
| 7,363,982 B2 | 4/2008 | Hopper | |
| 7,569,097 B2 | 8/2009 | Campen et al. | |
| 7,658,228 B2 | 2/2010 | Moksvold | |
| 7,699,099 B2 * | 4/2010 | Bolding et al. | 166/89.1 |
| 7,718,676 B2 | 5/2010 | Moussy et al. | |
| 7,740,074 B2 | 6/2010 | White et al. | |
| 7,757,772 B2 | 7/2010 | Donohue et al. | |
| 7,770,653 B2 * | 8/2010 | Hill et al. | 166/379 |
| 7,823,648 B2 * | 11/2010 | Bolding et al. | 166/375 |
| 2001/0050185 A1 | 12/2001 | Calder et al. | |
| 2002/0000315 A1 | 1/2002 | Kent et al. | |
| 2002/0070026 A1 | 6/2002 | Fenton et al. | |
| 2002/0074123 A1 | 6/2002 | Regan | |
| 2003/0010498 A1 * | 1/2003 | Tolman et al. | 166/305.1 |
| 2003/0145997 A1 | 8/2003 | Langford et al. | |
| 2003/0146000 A1 | 8/2003 | Dezen et al. | |
| 2004/0057299 A1 | 3/2004 | Kozakai et al. | |
| 2004/0154790 A1 | 8/2004 | Cornelssen | |
| 2004/0154800 A1 * | 8/2004 | Jack et al. | 166/305.1 |
| 2004/0200620 A1 | 10/2004 | Ostergaard | |
| 2004/0206507 A1 * | 10/2004 | Bunney | 166/312 |
| 2004/0251030 A1 | 12/2004 | Appleford et al. | |
| 2005/0028984 A1 | 2/2005 | Donald et al. | |
| 2005/0058535 A1 | 3/2005 | Meshenky et al. | |
| 2005/0109514 A1 | 5/2005 | White et al. | |
| 2005/0173322 A1 | 8/2005 | Ostergaard | |
| 2006/0237194 A1 * | 10/2006 | Donald et al. | 166/369 |
| 2007/0144743 A1 | 6/2007 | White et al. | |
| 2008/0128139 A1 | 6/2008 | White | |
| 2008/0169097 A1 * | 7/2008 | Bolding et al. | 166/263 |
| 2009/0025936 A1 | 1/2009 | Donald et al. | |
| 2009/0126938 A1 | 5/2009 | White | |
| 2009/0260831 A1 | 10/2009 | Moksvold | |
| 2009/0266550 A1 | 10/2009 | Felton | |
| 2009/0294125 A1 | 12/2009 | Donald et al. | |
| 2009/0294132 A1 | 12/2009 | Donald et al. | |

| | | | |
|---|---|---|---|
| 2009/0301727 | A1 | 12/2009 | Donald et al. |
| 2009/0301728 | A1 | 12/2009 | Donald et al. |
| 2010/0025034 | A1 | 2/2010 | Donald et al. |
| 2010/0044038 | A1 | 2/2010 | Donald et al. |
| 2010/0206546 | A1 | 8/2010 | Donald et al. |
| 2010/0206547 | A1 | 8/2010 | Donald et al. |
| 2010/0206576 | A1 | 8/2010 | Donald et al. |

FOREIGN PATENT DOCUMENTS

| | | | |
|---|---|---|---|
| BR | P10415841 | | 3/2007 |
| CH | 638019 | | 8/1983 |
| DE | 2541715 | | 4/1976 |
| DE | 3738424 | | 5/1989 |
| DE | 3738425 | | 5/1989 |
| EP | 0036213 | | 9/1981 |
| EP | 0572732 | | 12/1992 |
| EP | 0568742 | | 11/1993 |
| EP | 0719905 | | 3/1996 |
| EP | 0841464 | | 5/1998 |
| EP | 1990505 | | 9/2002 |
| EP | 1639230 | | 1/2009 |
| EP | 1918509 | | 10/2009 |
| FR | 2710946 | | 4/1995 |
| GB | 2424913 | | 11/1925 |
| GB | 1022352 | | 3/1966 |
| GB | 2197675 | | 5/1998 |
| GB | 2319795 | | 6/1998 |
| GB | 2346630 | | 8/2000 |
| GB | 2361726 | | 10/2001 |
| GB | 0312543.2 | | 5/2003 |
| GB | 0405454.0 | | 3/2004 |
| GB | 0405471.4 | | 3/2004 |
| GB | 2445493 | | 7/2008 |
| NO | 20051778 | A | 10/2006 |
| WO | WO 90/08897 | | 8/1990 |
| WO | 96/30625 | | 10/1996 |
| WO | 98/15712 | | 4/1998 |
| WO | WO99/06731 | | 2/1999 |
| WO | 99/28593 | | 6/1999 |
| WO | 99/49173 | | 9/1999 |
| WO | 0047864 | | 8/2000 |
| WO | WO00/53937 | | 9/2000 |
| WO | 00/70185 | | 11/2000 |
| WO | 02/38912 | | 6/2002 |
| WO | 02/088519 | | 11/2002 |
| WO | 2003033868 | | 4/2003 |
| WO | 2003078793 | | 9/2003 |
| WO | 2005047646 | | 5/2005 |
| WO | WO2005/040545 | | 5/2005 |
| WO | WO2005047646 | | 5/2005 |
| WO | 2005083228 | | 9/2005 |
| WO | WO 2006041811 | A2 * | 4/2006 |
| WO | WO2007079137 | | 7/2007 |
| WO | WO 2008/034024 | | 3/2008 |

OTHER PUBLICATIONS

U.S. Appl. No. 60/548,630, filed Feb. 23, 2004 (23 p.).
U.S. Appl. No. 61/190,048, filed Nov. 19, 2007 (24 p.).
Australian Examination Report dated Jul. 3, 2003 for Appl. No. 47694/00 (2 p.).
Response to Australian Examination Report dated Jul. 3, 2003 for Appl. No. 47694/00 (20 p.).
Australian Examination Report dated Jul. 21, 2006 for Appl. No. 2002212525; (2 p.).
Response to Australian Examination Report dated Jul. 21, 2006 for Appl. No. 2002212525; (33 p.).
Brazilian Examination Report dated Apr. 3, 2008 for Appl. PI0115157-6; (3 p.).
Response to Brazilian Examination Report of Apr. 3, 2008 for Appl. PI0115157-6 ; (7 p.).
Canadian Office Action dated Jan. 10, 2007 for Appl. No. 2,373,164; (2 p.).
Response to Canadian Office Action dated Jan. 10, 2007 for Appl. No. 2,373,164; (16 p.).
Canadian Office Action dated Oct. 12, 2007 for Appl. No. 2,428,165; (2 p.).
Response to Canadian Office Action dated Oct. 12, 2007 for Appl. No. 2,428,165; (16 p.).
EP International Search Report dated Mar. 4, 2002 for Appl PCT/GB01/04940; (3 p.).
EP Communication dated Sep. 19, 2006 for App. No. 01980737.9; (1 p.).
EP Response to EPO Communication dated Sep. 19, 2006 for App. No. 01980737.9; (5).
EP Article 96(2) Communication for Application No. EP04735596.1 dated Feb. 5, 2007 (6 p.).
EP Search Report for for Appl. No. 06024001.7 dated Apr. 16, 2007; (2 p.).
EP Examination Report for Appl. 01980737.9 dated Jun. 15, 2007; (5 p.).
Response to EP Examination Report of Jun. 15, 2007 for Appl. 01980737.9; (12 p.).
EP Examination Report for Appl. No. 06024001.7 dated Dec. 13, 2007; (1 p.).
Response to EP Examination Report for Appl. No. 06024001.7 dated Dec. 13, 2007; (6 p.).
EP Search Report for Appl. EP08000994.7 dated Mar. 28, 2008 (4 p.).
Response to EP Examination Report dated Oct. 30, 2008 with Amended Specification for Appl. 08000994.7 (94 p.).
EP Examination Report dated Oct. 30, 2008 for Appl. 08000994.7; (2 p.).
Response to EP Written Opinion dated Aug. 8, 2008 for Appl. 08000994.7; (10 p.).
EP Examination Report dated Nov. 22, 2007 for Appl. 04735596.1; (3 p.).
Response to Examination Report dated Nov. 22, 2007 for Appl. EP04735596.1 (101 p.).
Response to Examination Report dated Feb. 5, 2007 for Appl. 04735596.1 ; (15 p.).
US Office Action for U.S. Appl. No. 12/541,934 dated Jan. 7, 2010; (5 p.).
Response to US Office Action for U.S. Appl. No. 12/541,934 dated Jan. 7, 2010; (6 p.).
US Office Action for U.S. Appl. No. 10/009,991 dated Feb. 26, 2003; (5 p.).
Response to US Office Action dated Feb. 26, 2003 for U.S. Appl. No. 10/009,991; (7 p.).
Notice of Allowance and Fee(s) Due for U.S. Appl. No. 10/009,991 Notice of Allowance dated May 28, 2003; (5 p.).
Notice of Allowance and Fee(s) Due dated Apr. 26, 2006 for U.S. Appl. No. 10/651,703 (6 p.).
Response to Notice of Allowance dated Apr. 26, 2006 for U.S. Appl. No. 10/651,703; (7 p.).
US Office Action dated Dec. 20, 2005 for U.S. Appl. No. 10/651,703; (5 p).
Response to US Office Action dated Dec. 20, 2005 for U.S. Appl. No. 10/651,703; (13 p.).
IPRP, Search Report and Written Opinion dated Sep. 4, 2001 for Appl. PCT/GB00/01785; (17 p.).
EP Examination Report Dated dated Nov. 10, 2010 for Appl. No. 07842464.5; (3 p.).
EP Official Communication dated Mar. 5, 2003 for Appl. No. 00929690.6 (2 p.).
EP Response to Official Communication dated Mar. 5, 2003 for Appl. No. 00929690.6; (5 p.).
EP Official Communication dated Aug. 29, 2003 for Appl. No. 00929690.6; (3 p.).
EP Examination Report dated Apr. 28, 2004 for Appl. No. 00929690.6; (3 p.).
Response to EP Examination Report dated Apr. 28, 2004 for Appl. No. 00929690.6; (20).
EP Examination Report dated May 18, 2009 for EP Appl. No. 08162149.2; (8).
Response to EP Examination Report dated May 18, 2009 for Appl. No. 08162149.2; (132 p.).
Response to EP Article 94(3) and Rule 71(1) Communication dated May 18, 2009 for Appl. No. 08162149.2; (3 p.).
EP Search Report dated Jun. 25, 2010 for Appl. 10 16 1116 (2 p.).
EP Search Report dated Jun. 25, 10 for Appl. 10 16 1117 (2 p).

EP Search Report dated Jun. 25, 10 for EP Appl. 10 16 1120 (2 p.).
Norwegian Examination Report dated Aug. 19, 2005 for Appl. 2001 5431; (6 p.) (w/uncertified translation).
Response to Norwegian Examination Report dated Aug. 19, 2005 Appl. 2001 5431; (19 p.) (w/uncertified translation).
NO Examination Report dated Mar. 22, 2010 for Norwegian Appl. 2003 2037 (8 p.) w/uncertified translation).
PCT International Search Report for Appl. PCT/GB01/04940 dated Mar. 4, 2002; (3 p.).
PCT Search Report and Written Opinion dated Sep. 22, 2004 for Appl. PCT/GB2004//002329 (13 p.).
PCT Search Report and Written Opinion for Appl. PCT/GB2005/000725 dated Jun. 7, 2005; (8 p.).
PCT Search Report and Written Opinion for Appl. PCT/GB2005/003422 dated Jan. 27, 2006; (8 p.).
PCT Search Report and Written Opinion for Appl. PCT/GB2004//002329 dated Apr. 16, 2007; (10 p.).
Baker Hughes; Intelligent Well System; A Complete Range of Intelligent Well Systems; (undated) (4 p.).
Patent Search Report (INPADOC Patent Family) (3 p.) Undated.
Venture Training Manual Part 1 (p. 48) (Undated).
Venture Training Manual Part 2 (p. 25) (Undated).
Petroleum Abstracts Oct. 30, 2001; (79 p).
Petroleum Abstracts Oct. 25, 2001; (48 p).
Derwent Abstracts Nov. 2, 2001; (16 p).
ABB Retrievable Choke Insert; (pp. 3, 8) (Undated).
ABB Brochure entitled "Subsea Chokes and Actuators" dated Oct. 2002 (12 p).
Online publication; Weatherford RamPump dated Aug. 10, 2005; (2 p.).
Offshore Article "Multiphase Pump" dated Jul. 2004; (1 p) (p. 20).
Kvaerner Oilfield Products A.S. Memo—Multiphase Pumping Technical Issues dated May 19, 2004 (10 p.).
Framo Multiphase Booster Pumps dated Aug. 10, 2005; (1 p).
Kvaerner Pump Photo (Undated) (1 p.).
Aker Kvaerner; Multibooster System; (4 p.) (undated).
"Under Water Pump for Sea Bed Well" by A. Nordgren, Dec. 14, 1987; Jan. 27, 2006; (2 p.).
Force Pump, Double-Acting, Internet, Glossary dated Sep. 7, 2004; (2 p.).
Progressing Cavity and Piston Pumps; National Oilwell (2 P.) (Undated).
Jetech DA-4D & DA-8D Ultra-High Pressure Increases; (3 p.) (undated).
Weatherford Artificial Lift Systems (2 p.) (undated).
SG Examination Report for Singapore Appl. SG200507390-3 dated Jan. 10, 2007; (5 p.).
U.S. Office Action dated Mar. 25, 2004 for U.S. Appl. No. 10/415,156 (6 p.).
Response to U.S. Office Action dated Mar. 25, 2004 for U.S. Appl. No. 10/415,156 (9 p.).
Notice of Allowance dated Jul. 26, 2004 for U.S. Appl. No. 10/415,156 (4 p.).
PCT International Search Report & Written Opinion for Appl. PCT/US2007/078436 dated Aug. 12, 2008; (9 p.).
PCT International Search Report and Written Opinion for PCT/US2007/084884 dated Jun. 13, 2008 (8 p.).
[online] www.subsea7,com; New Technology to Increase Oil Production Introduced to Subsea Market; dated Jun. 13, 2002; (2 p.).
[online] www.subsea7.com; Multiple Application Re-Injection System; (undated); (2 p.).
Notice of Litigation for U.S. Appl. No. 10/558,593; (77 p.).
U.S. Office Action dated Mar. 18, 2010 for U.S. Appl. No. 10/558,593; (6 p.).
U.S. Office Action dated Feb. 11, 2008 for U.S. Appl. No. 10/558,593; (7 p).
Response to U.S. Office Action dated Feb. 11, 2008 for U.S. Appl. No. 10/558,593; (12 p).
U.S. Office Action dated Jul. 10, 2008 for U.S. Appl. No. 10/558,593; (6 p).
Response to U.S. Office Action dated Jul. 10, 2008 for U.S. Appl. No. 10/558,593; (12 p).
U.S. Office Action dated Jan. 8, 2009 for U.S. Appl. No. 10/558,593; (8 p.).
Response to U.S. Office Action dated Jan. 8, 2009 for U.S. Appl. No. 10/558,593; (31 p.).
U.S. Final Office Action dated Jul. 7, 2009 for U.S. Appl. No. 10/558,593 (6 p.).
Response to U.S. Final Office Action dated Jul. 7, 2009 for U.S. Appl. No. 10/558,593 (26 p.).
U.S. Office Action dated Jul. 21, 2010 for U.S. Appl. No. 10/558,593; (10 p.).
SG Written Opinion dated Oct. 12, 2010 for Singapore Appl. No. 200903221-0; (11 p.).
AU Examiner's Report dated Sep. 14, 2010 for Appl. No. 2004289864; (2 p.).
EP Examination Report dated May 4, 2010 for Appl. 07864486.1; (3 p.).
EP Examination Report dated May 4, 2010 for Appl. 07864482.0; (3 p.).
EP Examination Report dated Aug. 2, 2010 for Appl. EP10161117.6; (1 p.).
EP Examination Report dated Aug. 2, 2010 for Appl. EP10161116.8; (1 p.).
EP Examination Report dated Aug. 4, 2010 for Appl. EP10161120.0; (1 p.).
SG Written Opinion for Singapore Appl. 200903220-2 dated May 3, 2010; (5 p.).
U.S. Office Action dated Aug. 31, 2010 for U.S. Appl. No. 10/590,563; (13 p.).
U.S. Office Action dated Oct. 6, 2010 for U.S. Appl. No. 12/541,938; (7 p).
U.S. Office Action dated Aug. 12, 2010 for U.S. Appl. No. 12/441,119; (14 p.).
Response to U.S. Office Action dated Aug. 12, 2010 for U.S. Appl. No. 12/441,119; (12 p.).
Response to U.S. Office Action dated Jul. 21, 2010 for U.S. Appl. No. 10/558,593; (9 p.).
PCT International Search Report & Written Opinion dated Aug. 12, 2008 for Appl. PCT/US2007/078436; (9 p.).
PCT International Search Report and Written Opinion dated Jun. 13, 2008 for Appl. PCT/US2007/084879;(9 p.).
EP Examination Report dated Oct. 12, 2010 for Appl 10167182.4; (3 p.).
EP Examination Report dated Oct. 14, 2010 for Appl. 10167181.6; (3 p.).
EP Examination Report dated Oct. 14, 2010 for Appl. 10167184.0; (3 p.).
EP Examination Report dated Oct. 14, 2010 for Appl. 10167183.2; (3 p.).
Response to EP Exam Report dated Oct. 14, 2010, Application No. 10167181.6 Response filed Feb. 9, 2011.
Response to EP Exam Report dated Oct. 14, 2010, Appl. 10167183.2 Filed Feb. 14, 2011 (4 pp).
Response to EP Exam Report dated Oct. 14, 2010, Appl. 10167182.4 Filed Feb. 10, 2011 (6 pp).
Response to EP Exam Report dated Oct. 14, 2010, Appl. 10167184.0 Filed Feb. 10, 2011 (8 pp).
EP Office Action Pursuant to Article 94(3) dated Dec. 29, 2010, Application No. 06024001.7 (4 pp).
A750/09, In the Court of Session, Intellectual Property Action, Note of Arguments for the First to Fifth Defenders, Dec. 30, 2010 (18 pp).
A750/09; In the Court of Session; Intellectual Property Cause; Response for the Pursuers to the Note of Argument for the Defenders (Mar. 3, 2011) (12 pp).
Response to Office Action dated Oct. 6, 2010, U.S. Appl. No. 12/541,938, filed Jan. 11, 2011 (8 pp).
Response to Office Action dated Dec. 7, 2010, U.S. Appl. No. 12/541,936 (9 pp) Filed Jan. 20, 2011.
Notice of Allowance and Fee(s) Due dated Jan. 6, 2011, U.S. Appl. No. 10/558,593 (26 pp).
Office Action dated Feb. 16, 2011, U.S. Appl. No. 12/541,937.
Final Office Action dated Mar. 2, 2011, U.S. Appl. No. 10/590,563.
AU Examiner's Report No. 3 dated Dec. 13, 2010, Application No. 2004289864.

Canadian Office Action dated Dec. 6, 2010, Application No. 2,526,714 (3 pp).
EP Article 96(2) Communication dated Jun. 12, 2007, Application No. 05717806.3 (3pp).
EP Response to Article 96(2) Comm. dated Jun. 12, 2007, Application No. 05717806.3 (17pp) Response filed Sep. 19, 2007.
EP Response to Exam Report dated Aug. 2, 2010, Application No. EP10161117.6 (6pp) Response Filed Dec. 2, 2010.
EP Response to Exam Report dated Aug. 2, 2010, Application No. EP10161116.8 (13pp) Response filed Dec. 2, 2010.
EP Response to Exam Report dated Aug. 4, 2010, Application No. EP10161120.0 (6pp) Response Filed Dec. 2, 2010.
Response to EP Exam Report dated Nov. 10, 2010, Application No. 07842464.5 Response filed Mar. 18, 2011.
EP Search Report and Opinion dated Dec. 3, 2010, Application No. 10185795.1 (4pp).
EP Search Report dated Dec. 9, 2010, Application No. EP10013192 (3pp).
Norwegian Office Action dated Oct. 20, 2010, Application No. 20032037 (4pp).
Notice of Litigation for U.S. Appl. No. 10/558,593 (77pp).
A750/09, In the Court of Session, Intellectual Property Action, Closed Record, In the Cause *D.E.S. Operations et al.* vs. *Vetco Gray Inc. et al.*, Updated record to include adjusted Answers to Minute of Amendment, Oct. 21, 2010 (90pp).
Initiation of Proceedings Before the Comptroller, Oct. 22, 2009; In the Matter of DES Operations Limited and Cameron Systems Ireland Limited and Vetco Gray Inc., and in the Matter of an Application Under Sections 133, 91A, 121A, and 371 of the Patent Act 1977, Statement of Grounds, Oct. 22, 2009 (21pp.
Response to Singapore Written Opinion dated Oct. 12, 2010, Application No. 200903221-0 (14 pp) Response filed Mar. 8, 2011.
Provisional Application filed Feb. 26, 2004, U.S. Appl. No. 60/548,727.
Response to Notice of Allowance dated Apr. 26, 2006, U.S. Appl. No. 10/651,703 (7pp).
Office Action dated Dec. 7, 2010, U.S. Appl. No. 12/541,936 (6pp).
Response to Final Office Action dated Mar. 2, 2011, U.S. Appl. No. 10/590,563 Response filed Apr. 26, 2011.
Norwegian Office Action dated Mar. 28, 2011, Application No. 2001 5431 Recovery of Production Fluids From an Oil or Gas Well (3 pp).
Final Office Action dated Mar. 30, 2011, U.S. Appl. No. 12/541,938 (5 pp).
Response to Final Office Action dated Mar. 30, 2011 (10 pp), U.S. Appl. No. 12/541,938 Response filed Apr. 18, 2011.
Notice of Allowance dated Apr. 1, 2011 (5 pp), U.S. Appl. No. 12/541,936.
Notice of Allowance dated Apr. 4, 2011, U.S. Appl. No. 10/558,593 (5 pp).
Office Action dated Apr. 14, 2011, U.S. Appl. No. 12/768,324.
Office Action dated Apr. 28, 2011, U.S. Appl. No. 12/768,332.
Notice of Allowance dated May 6, 2011, U.S. Appl. No. 12/541,938.
Office Action/Advisory Action dated May 6, 2011 U.S. Appl. No. 10/590,563.
Office Action dated May 25, 2011, U.S. Appl. No. 12/515,534.
Supplemental Notice of Allowance dated Jun. 8, 2011; U.S. Appl. No. 12/541,936 (2p.) (1600-19406).
Supplemental Notice of Allowance dated Jul. 7, 2011; U.S. Appl. No. 10/558,593 (7p.) (1600-19404).
Response to Office Action dated Apr. 14, 2011; U.S. Appl. No. 12/768,324; Response filed Jul. 14, 2011 (7p.) (1600-19418).
Response to Office Action dated Apr. 28, 2011; U.S. Appl. No. 12/768,332; Response filed Jul. 19, 2011 (7p.) (1600-19417).
U.S. Office Action dated Jul. 21, 2011; U.S. Appl. No. 12/515,729; (53p.) (1600-19602).
Notice of Allowance dated Jun. 28, 2011; U.S. Appl. No. 10/590,563 (14p.) (1600-19502).
Response to Office Action dated Dec. 6, 2010; Canadian Application No. 2,526,714; Response filed Jun. 6, 2011 (16p.) (1600-19422).
Response to Search Opinion; European Application No. 10185212.8; Response filed Jun. 29, 2011 (13p.) (1600-19432).
Examination Report dated Jun. 30, 2011; European Application No. 10161116.8 (2p.) (1600-19413).
Examination Report dated Jun. 30, 2011; European Application No. 10161117.6 (2p.) (1600-19414).
Examination Report dated Jun. 30, 2011; European Application No. 10161120.0 (2p.) (1600-19415).
Examination Report dated Jun. 30, 2011; European Application No. 10167181.6 (2p.) (1600-19412).
Examination Report dated Jun. 30, 2011; European Application No. 10167182.4 (2p.) (1600-19430).
Examination Report dated Jun. 30, 2011; European Application No. 10167183.2 (2p.)(1600-19424).
Examination Report dated Jun. 30, 2011; European Application No. 10167184.0 (2p.) (1600-19431).
Norwegian Response to Office Action dated Jun. 22, 2011; Application No. 20015431 (19p.) (1600-19226).
European Response to Search Opinion dated Aug. 3, 2011; Application No. 10185795.1 (12 p.) (1600-19434).
Summons to Oral Proceedings dated Aug. 3, 2011; European Application No. 01980737.9 (3 p.) (1600-19305).
European Response to Search Opinion dated Aug. 10, 2011; Application No. 10013192.9 (10 p.) (1600-19433).
European Office Action dated Aug. 22, 2011; Application No. 10185612.8 (2 p.) (1600-19432).
European Response to Oral Summons dated Sep. 22, 2011; Application No. 01980737.9 (42 p.) (1600-19305).
Notice of Allowability dated Aug. 26, 2011; U.S. Appl. No. 10/590,563 (11 p.) (1600-19502).
U.S. Final Office Action dated Sep. 7, 2011; U.S. Appl. No. 12/541,937 (13 p.) (1600-19407).

* cited by examiner

CAPILLARY INJECTOR

CROSS REFERENCE TO RELATED APPLICATIONS

This application is the U.S. National Phase Application of International Application No. PCT/US2007/78436, entitled "Capillary Injector", filed Sep. 13, 2007, which claims priority to Great Britain Provisional Patent Application No. GB0618001.2, entitled "Capillary Injector", filed on Sep. 13, 2006, which is herein incorporated by reference.

Other related applications include U.S. application Ser. No. 10/009,991 filed on Jul. 16, 2002, now U.S. Pat. No.6,637,514; U.S. application Ser. No. 10/415,156 filed on Apr. 25, 2003, now U.S. Pat. No. 6,823,941; U.S. application Ser. No. 10/558,593 filed on Nov. 29, 2005; U.S. application Ser. No. 10/590,563 filed on Dec. 13, 2007; U.S. application Ser. No. 12/515,534 filed on May 19. 2009; U.S. application Ser. No. 12/515,729 filed on May 20, 2009; U.S. application Ser. No. 12/541,934 filed on Aug.15, 2009; U.S. application Ser. No. 12/541,936filed Aug. 15, 2009; U.S. application Ser. No. 12/541,937 filed on Aug. 15, 2009; U.S. application Ser. No. 12/541,938 filed on Aug. 15, 2009; U.S. application Ser. No. 12/768,324 filed on Apr. 27, 2010; U.S. application Ser. No. 12/768,332 filed on Apr. 27, 2010; and U.S. application Ser. No. 12/768,337filed on Apr. 27, 2010.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

This invention relates to a system and method of treating a well, particularly to an oil, gas or water well. As will be appreciated, oil and natural gas have a profound effect on modern economies and societies. In order to meet the demand for such natural resources, numerous companies invest significant amounts of time and money in searching for and extracting oil, natural gas, and other subterranean resources from the earth. Particularly, once a desired resource is discovered below the surface of the earth, drilling and production systems are employed to access and extract the resource. These systems can be located onshore or offshore depending on the location of a desired resource. Further, such systems generally include a wellhead assembly through which the resource is extracted. These wellhead assemblies generally include a wide variety of components and/or conduits, such as a Christmas tree (tree), various control lines, casings, valves, and the like, that control drilling and/or extraction operations.

As will be appreciated, various control lines or other components of a production or transport system are employed to provide a path for hydraulic control fluid, chemical injections, or the like to be passed through the wellhead assembly. For instance, chemicals and gases are injected into the well in order to treat scale, wax or other factors that tend to reduce the value, quality or quantity of fluids produced from the well. However, various injection methods may have varying uses and degrees of success. For example, certain systems and methods are suited for a particular style of wellhead or may provide a limited enhancement to the recovery operation.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

According to the present invention there is provided a method of treating a well comprising injecting a chemical into the well in order to enhance recovery of production fluids from the well, wherein the well has a wellhead and a tree located above the wellhead, and wherein the chemical is conveyed to the area of the well to be treated by means of a capillary conduit located in a production bore of the well, with a lower end of the capillary conduit terminating in an outlet for the fluid adjacent to the area of the well to be treated, and wherein an upper end of the capillary conduit terminates in a port for injection of chemicals into the capillary conduit, and wherein the port at the termination of the upper end of the capillary tubing is located above the wellhead.

In preferred embodiments of the invention the injection port is located on the tree, or on a tree cap. In certain embodiments of the invention, the chemical injection port terminating the upper end of the capillary conduit can be located on a branch of the tree, and typically on a wing branch. In certain embodiments, the chemical injection port can be provided on a choke on the wing branch of the tree. A choke body adapted specifically to accommodate the chemical injection port can optionally be provided, and forms another aspect of the invention.

The invention also provides apparatus for treating a well comprising a chemical injection line, the chemical injection line comprising a capillary conduit extending from the production zone of the well to the wellhead, and wherein the chemicals are injected through a port located above the wellhead.

The chemical injection port can comprise a control valve in order to permit injection of the chemicals into the well, but may be adapted to restrain the passage of fluids from the well out through the injection port.

It may be appreciated that the chemicals can be any suitable chemicals for treating downhole wells, for example scale inhibitors, wax inhibitors etc.

Typically the well is a subsea well.

Figure 1:
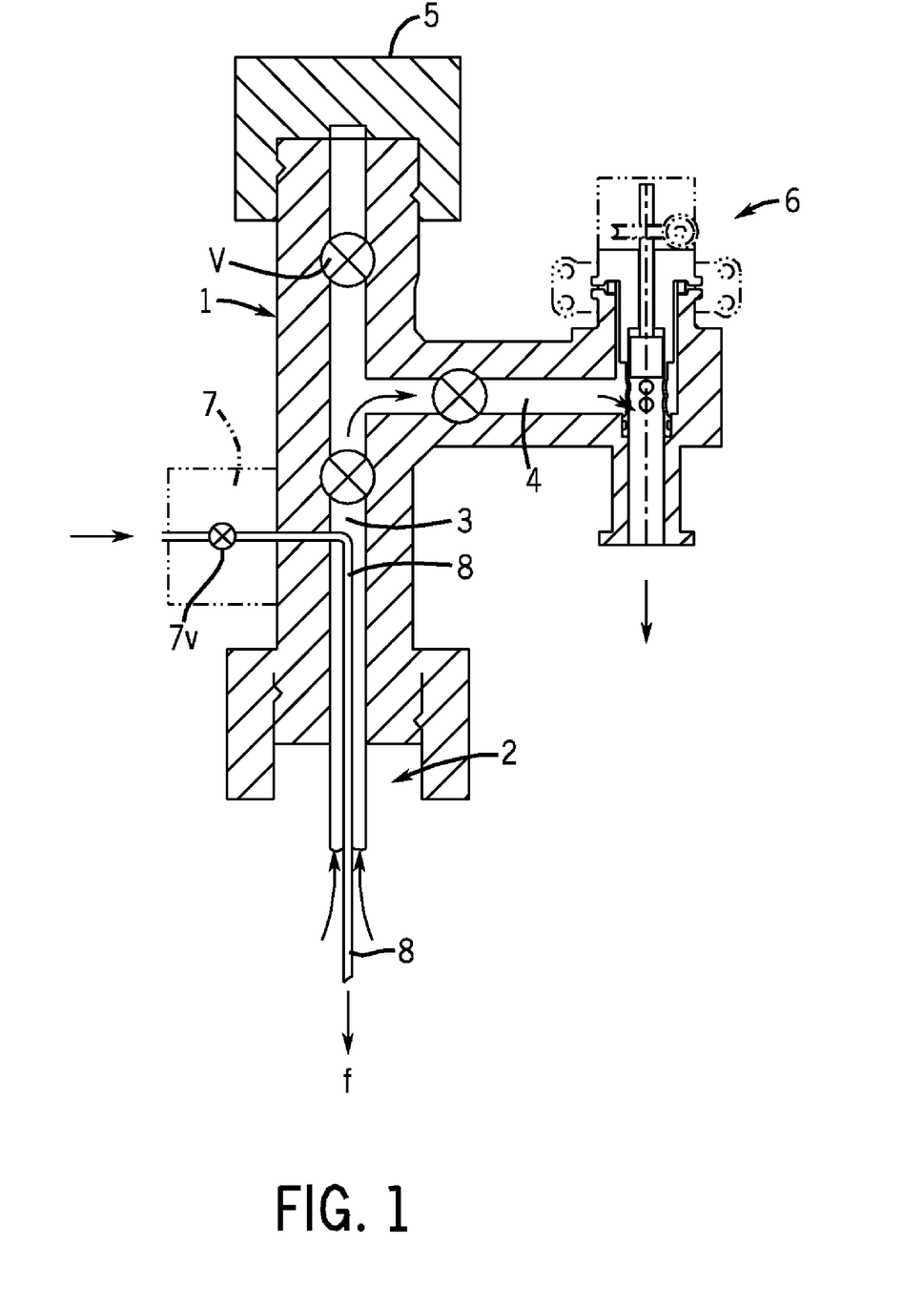
FIG. 1 is a cross-sectioned view of an embodiment of a subsea tree in accordance with the present technique.

Referring now to FIG. 1, a subsea well has a tree 1 located on a wellhead 2. The tree 1 has a production bore 3 that is connected to production tubing. The production tubing is below the tree 1, and extends to the formation F to convey production fluids from the formation F back to the tree 1 for recovery therefrom. The production bore 3 in the tree 1 has a wing branch 4 through which production fluids are routed by means of valves within the production bore 3 and wing branch 4. A valve V closes the upper end of the production bore 3 of the well 1 beneath a tree cap 5. The wing branch 4 has a choke 6 in order to control the flow of produced fluids through the outlet of the wing branch 4.

The production bore 3 has a port 7 in a side wall thereof which terminates a capillary conduit 8 that extends between the port 7 and the formation F. In certain embodiments, the capillary conduit 8 is at least substantially or entirely made of titanium or another suitable material. The capillary conduit 8 is intended for use with chemicals intended to treat the well formation F, and conveys the chemicals between the port 7 and the formation F. The port 7 may optionally have a valve 7$v$ in order to control the pressure of chemicals being injected through the port 7 and conduit 8, and to control the back pressure exerted from the formation F.

In use, the chemicals are injected through the port 7 into the capillary conduit 8 and emerge from the outlet of the capillary conduit 8 in the region of the formation F to be treated with the chemicals. The capillary conduit 8 takes up minimal space within the production bore 3, and does not substantially affect the capacity of the production bore 3, or the production tubing to which it is attached, to convey the production fluids from the formation F to the tree 1. The chemicals injected via the port 7 and the capillary conduit 8 can be used to treat scale, wax, acid or any other undesirable chemicals in the region of the formation F or in other areas of the well that may affect the quality or quantity of production fluids recovered from the well. Other types of chemical can be deployed by the port 7 and capillary conduit 8.

The port 7 is located above the wellhead 2 in the region of the side wall of the tree 1. In certain embodiments similar to FIG. 1, the port 7 can be located within the production bore 3, for example, the capillary conduit 8 can terminate within a plug located within the production bore 3, and a side branch can be provided within the plug (and optionally the capillary conduit 8) to facilitate injection of the chemicals into the plug, and thereby into the capillary conduit 8.

Figure 2:
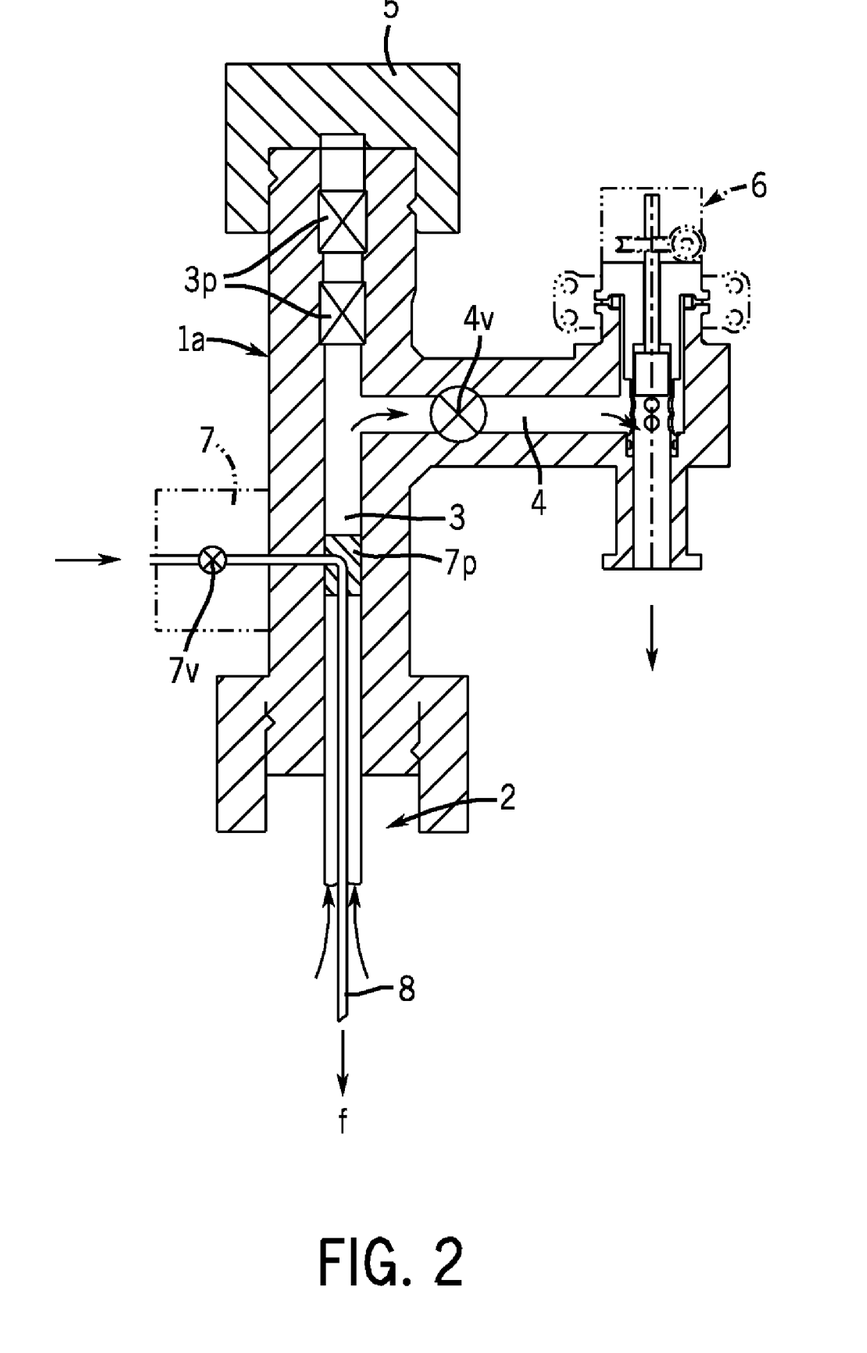
FIG. 2 is a cross-sectioned view of a second embodiment of the subsea tree in accordance with the present technique.

Referring now to FIG. 2, this shows a horizontal style subsea tree 1$a$, which is similar to the tree 1 shown in FIG. 1, but has a different arrangement of valves to control the flow of production fluids. Typically, the horizontal style tree 1$a$ has a single wing valve 4$v$, and a number of production bore plugs 3$p$ installed within the production bore 3 above the wing branch 4 and below the tree cap 5. The configuration of the choke 6, the wing branch 4, and the wellhead 2 are identical to that disclosed for the well of FIG. 1. The capillary conduit 8 in the FIG. 2 well terminates within a plug 7$p$ that is located within the production bore 3 below the wing branch 4, but above the wellhead 2. The plug 7$p$, as previously described provides an axial termination of the capillary conduit 8 within the production bore 3, and provides a lateral injection port 7 extending through the side wall of the production bore 3. In use, the chemicals injected into the tree 1$a$ are injected into the port 7 and through the side wall of the production bore 3, and enter the capillary conduit 8 at the plug 7$p$.

Figure 3:
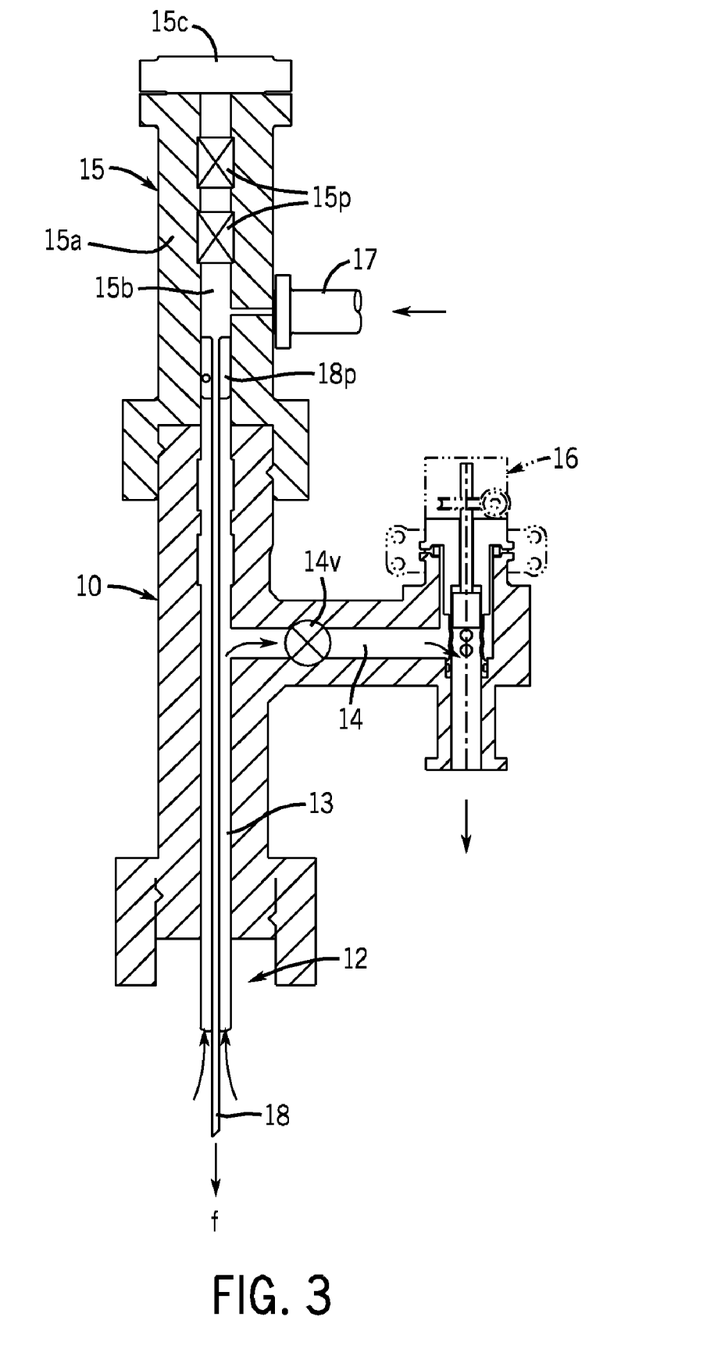
FIG. 3 is a cross-sectioned view of a third embodiment of the subsea tree in accordance with the present technique.

FIG. 3 describes a different design of subsea well embodying a capillary injection conduit system. The FIG. 3 well is a typical horizontal tree 10, with the tree plugs 3$p$ having been pulled, the tree cap 5 removed, and a specialized tree cap adapter 15 installed for facilitating the injection of chemicals into the well through the tree 10. The tree 10 is mounted on the wellhead 12 and has a production bore 13 connected to production tubing leading to the formation F as previously described. The production bore 13 has a wing branch 14 with a wing branch valve 14$v$, and a choke 16 as previously described for the take off of production fluids. The production bore 13 is capped by a tree cap adapter 15 in the form of a cylindrical body 15$a$ with a pair of plugs 15$p$ that occlude the bore of the body 15$a$, and a cap 15$c$, that can optionally be removed to allow access to the plugs 15$p$ and the bore 15$b$ of the body 15, and the production bore 13. The central bore 15$b$ of the body 15$a$ has a conduit through its side wall leading to a port 17 for the injection of chemicals through the side wall conduit and into the bore 15$b$ of the body 15$a$, which is coaxial with, and a continuation of, the production bore 13. The bore 15$b$ of the body 15$a$ has a plug 18$p$ that terminates the end of a capillary conduit 18 extending from the plug 18$p$ downwards through the bore 15$b$ of the body 15$a$, and the production bore 13 of the tree 10. In certain embodiments, the capillary conduit 18 is at least substantially or entirely made of titanium or another suitable material. The capillary conduit 18 extends the length of the well and terminates at its lower end within the production bore 13 in the area of the formation F to be treated, typically in the area of the perforated casing at the heal of the well.

In operation of the FIG. 3 embodiment, chemicals to treat the formation are injected into the port 17, and transfer through the side wall conduit into the bore 15$b$ of the body 15$a$. They them pass through the plug 18$p$ and capillary conduit 18 into the area of the formation F to be treated. Production fluids are recovered from the production bore in the normal way, which is closed off above the wing branch 14 by means of the plug 18$p$, and by emergency plugs 15$p$.

Figure 4:
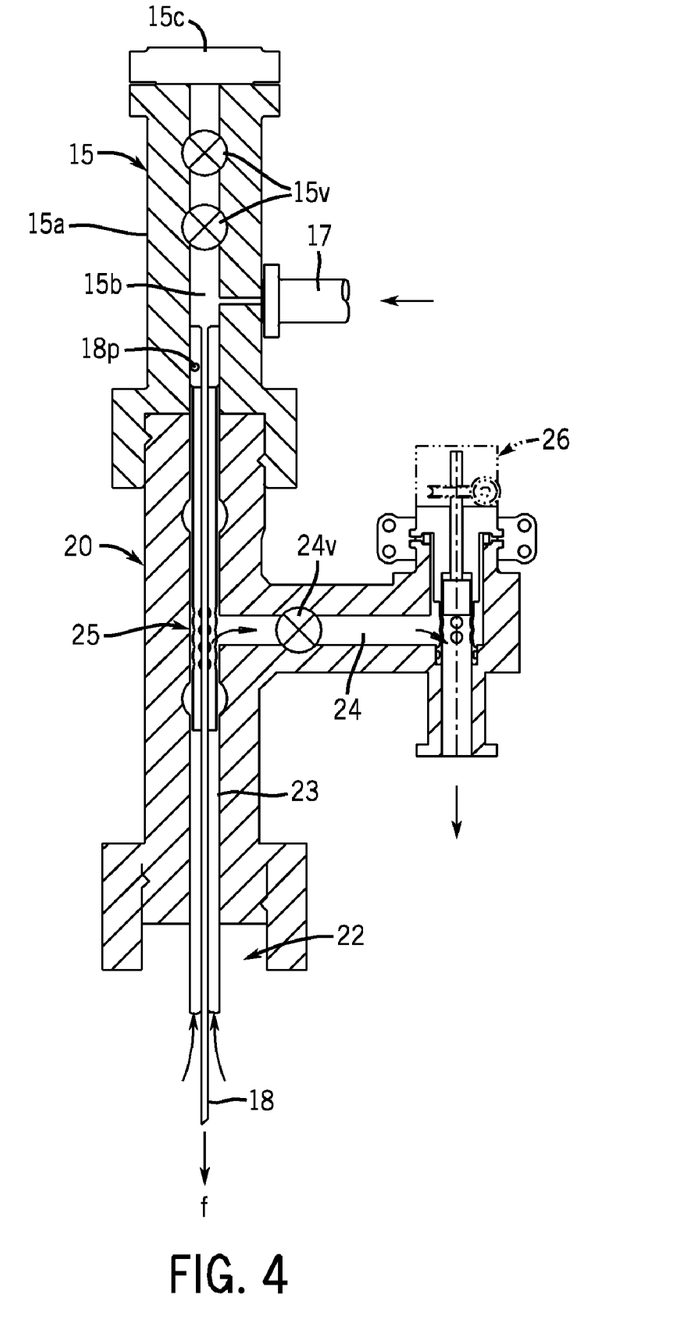
FIG. 4 is a cross-sectioned view of a fourth embodiment of the subsea tree in accordance with the present technique.

Referring now to FIG. 4, this illustrates a similar application to a traditional vertical subsea well similar to that shown in FIG. 1 with the production bore valves V removed. The FIG. 4 tree 20 is located on a wellhead 22, and has a production bore 23, a wing branch 24, a choke 26, and a tree cap 15 similar to the tree cap adapter 15 shown in FIG. 3, but with valves 15$v$ instead of plugs 15$p$. The tree 20 has a capillary conduit 18 terminating in a plug 18$p$ within the bore 15$b$ of the body 15$a$ as previously described, but typically the capillary conduit 18 is surrounded by a perforated cylindrical tube 25 permitting the flow of production fluid from the production bore 23 into the wing branch 24 for recovery as normal, but protecting the capillary conduit 18 from damage by the valves, which may either be removed or remain in place but held open by the tubing 25. With the FIG. 4 embodiment, chemicals used to treat the formation F are injected through the port 17, through the side wall conduit and into the bore 15$b$ of the body 15$a$, and through the capillary conduit 18 as previously described, whereas production fluids are gathered from the production tubing into the production bore 23, from where they can flow either inside or outside of the tubing 25 and are diverted into the wing branch 24 for recovery by means of the plug 18$p$, with provision for containment by the valves 15$v$ and the cap 15$c$.

Figure 5:
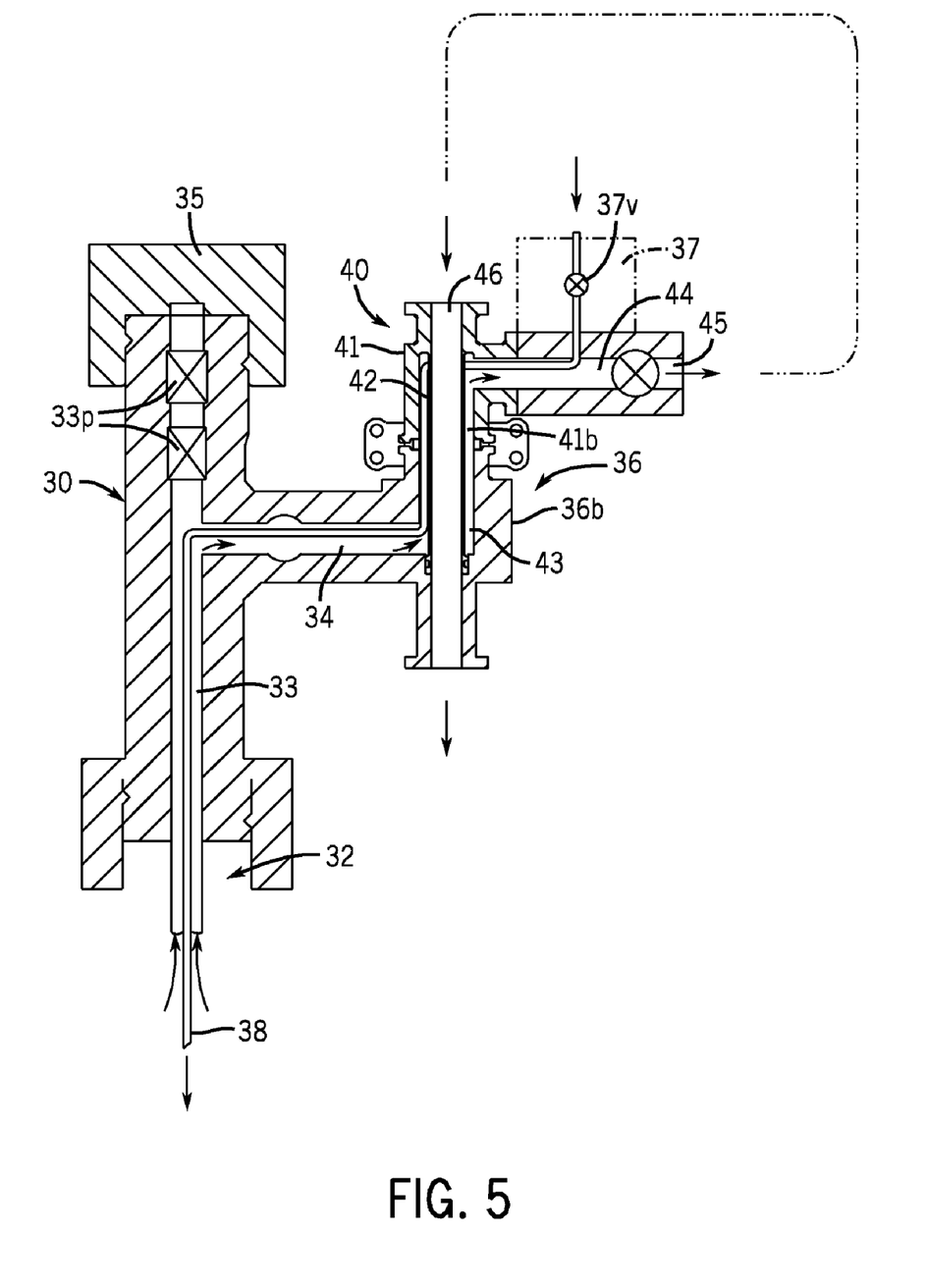
FIG. 5 is a cross-sectioned view of a fifth embodiment of the subsea tree in accordance with the present technique.

FIG. 5 shows a further embodiment based on a horizontal style of subsea tree 30 similar to that shown in FIG. 2. The tree 30 is secured above a wellhead 32, and has a production bore 33, a wing branch 34 from which the valve has been removed, and a cap 35 installed above two production bore plugs 33$p$ to contain the production fluids within the tree 30.

The FIG. 5 embodiment has a diverter assembly 40 located partially inside the choke body 36$b$ of the tree 30. In certain embodiments, the diverter assembly 40 is at least substantially or entirely made of titanium or another suitable material. In this embodiment, the internal parts of the choke 36 have been removed, leaving the choke body 36$b$. Choke body 36$b$ communicates with an interior bore of the wing branch 34. Optionally a further choke can be installed downstream of the choke body 36$b$, in order to control the flow of fluids from the well.

The diverter assembly 40 comprises a housing 41 with an axial bore 41$b$, an inner conduit 42 co-axial with the bore 41$b$, an inlet 46 and an outlet 45. Housing 41 is substantially cylindrical and in the inner bore 41b extends along its entire length and a connecting lateral passage 44 adjacent to its upper end leads to outlet 45. The housing 41 is adapted to attach to the upper end of choke body 36b by means of a conventional clamp. The conduit 42 is located inside axial passage 41b, creating an annulus 43 between the outside surface of conduit 42 and the inside surface of the axial bore 41b. Conduit 42 extends beyond the housing 41 into the choke body 36b, and past the junction between the wing branch 34 and its perpendicular outlet into which it is sealed just below the junction. Outlet 45 and inlet 46 are typically attached to conduits (not shown) which lead to and from processing apparatus, such as pumps etc., adapted to boost the pressure of the fluids being produced from the well.

In use, produced fluids come up the production bore 33, enter branch 34 and from there enter annulus 43 between conduit 42 and axial bore 41b. The produced fluids are prevented from going downwards towards the conventional choke outlet by the seals at the lower end of the conduit 42, so they are forced upwards into the annulus 43 and through connecting lateral passage 44 and outlet 45. Outlet 45 typically leads to a processing apparatus (e.g. a pumping or injection apparatus). Once the fluids have been processed, they are returned through a further conduit (not shown) to inlet 46. From here, the fluids pass through the inside of conduit 42 and exit though the conventional outlet of the choke 36, from where they are recovered normally via an export line.

The capillary injection conduit 38 extends from an injection port 37 through a side wall of the lateral passage 44, through the annulus 43, the wing branch 34, and the production bore 34, into the production tubing and down to the production zone to be treated as previously described. In certain embodiments, the capillary conduit 38 is at least substantially or entirely made of titanium or another suitable material. The chemicals to treat the well formation F are injected from the injection port 37 along this path previously described, while the production fluids are recovered on the same path, but the recovery is substantially unaffected by the narrow diameter of the capillary conduit. In some embodiments, the diverter assembly 40, or the capillary conduit 38, or both, comprise one or more titanium parts, layers, or portions, such that the assembly 40 and/or conduit 38 is at least partially, substantially, or entirely made of titanium.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A mineral extraction system for extracting production fluids from a well, comprising:
   a tree comprising a production bore and a branch comprising a branch passage communicating with the production bore for the flow of production fluids from the well;
   a diverter coupled to the branch and including a diverter flow path therethrough to access flow through the branch passage;
   the diverter comprising a lateral passage conduit with an outlet and communicating with the diverter flow path, the lateral passage conduit including an injection port in a side wall thereof and a valve disposed therein between the injection port and outlet; and
   a capillary injection conduit extending through the injection port, the lateral passage conduit, the diverter flow path, the branch passage, and into the production bore such that chemicals may be injected into the well through the capillary injection conduit at the same time production fluids are produced from the well through the production bore, branch passage, and diverter.

2. The mineral extraction system of claim 1, wherein the diverter comprises a diverter outlet path separate from a diverter inlet path, the diverter outlet path is coupled to a branch inlet path, and the diverter inlet path is coupled to a branch outlet path, the capillary injection conduit extending through the diverter outlet path, the lateral passage conduit including a lateral passage forming a part of the diverter inlet path and the valve comprising a closed position to close the diverter inlet path.

3. The mineral extraction system of claim 1, wherein the diverter comprises an inner conduit that extends into the branch passage to define two independent passages with the capillary injection conduit extending through the lateral passage conduit and through one of the independent passages.

4. The mineral extraction system of claim 3, wherein the inner conduit is coaxial with the branch passage to define an annulus between the inner conduit and the branch passage and the capillary injection conduit forming an annular region with the lateral passage conduit, the annulus communicating with the annular region in the lateral passage conduit.

5. The mineral extraction system of claim 4, comprising a process loop flowpath that comprises a first path through the annulus and the annular region of the lateral passage conduit and a second path through the inner conduit.

6. The mineral extraction system of claim 4, wherein the capillary injection conduit passes through the annulus.

7. The mineral extraction system of claim 4, wherein the capillary injection conduit passes through the lateral passage conduit, the annulus, the branch passage, and a production bore of a tree.

8. The mineral extraction system of claim 1, wherein the diverter comprises a retrofit kit that is disposed in place of a flow control, and the retrofit kit provides a first flow-path that diverts production flow through the lateral passage conduit and the output, and a second flowpath that returns the production flow through a diverter input to a branch output, the capillary injection conduit extending through the lateral passage conduit and through the first flowpath.

9. The mineral extraction system of claim 1, wherein the diverter, or the capillary injection capillary conduit, or both, are at least substantially made of titanium.

10. The mineral extraction system of claim 1 wherein
   the lateral passage conduit forms a lateral passage and the injection port extends through the side wall thereof;
   the valve is for controlling flow through the lateral passage; and
   the capillary injection conduit is disposed inside the branch passage and extends through the diverter, lateral passage, and the injection port.

11. A method of injecting chemicals into a well, comprising:
   disposing a branch on a tree with the branch including a choke body;
   routing a capillary injection conduit at least partially inside a lateral passage conduit on a diverter mounted on the choke body and extending through the branch and into a production bore of the tree
   forming an annular region within the lateral passage conduit; and
   producing fluids through the production bore, branch, choke body, diverter, and annular region of the lateral passage conduit while flowing the chemical through the capillary injection conduit and into the well.

* * * * *